(12) United States Patent
Cardoso et al.

(10) Patent No.: US 8,854,223 B2
(45) Date of Patent: Oct. 7, 2014

(54) IMAGE-BASED DETERMINATION OF CO AND $CO_2$ CONCENTRATIONS IN VEHICLE EXHAUST GAS EMISSIONS

(75) Inventors: George Cunha Cardoso, Webster, NY (US); Lalit Keshav Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 275 days.

(21) Appl. No.: 13/419,856

(22) Filed: Mar. 14, 2012

(65) Prior Publication Data

US 2013/0181836 A1 Jul. 18, 2013

Related U.S. Application Data

(63) Continuation-in-part of application No. 13/352,683, filed on Jan. 18, 2012.

(51) Int. Cl.
*G08B 17/10* (2006.01)

(52) U.S. Cl.
USPC .............................. 340/628; 340/463; 340/632

(58) Field of Classification Search
USPC ......... 340/463, 540, 603, 632, 627, 628, 633, 340/630
See application file for complete search history.

(56) References Cited

U.S. PATENT DOCUMENTS

| | | | |
|---|---|---|---|
| 5,210,702 A | 5/1993 | Bishop et al. | |
| 5,319,199 A | 6/1994 | Stedman et al. | |
| 5,371,367 A | 12/1994 | DiDomenico et al. | |
| 5,401,967 A | 3/1995 | Stedman et al. | |
| 5,489,777 A | 2/1996 | Stedman et al. | |
| 5,498,872 A * | 3/1996 | Stedman et al. | ........... 250/338.5 |
| 6,188,329 B1 * | 2/2001 | Glier et al. | ............................ 1/1 |
| 6,560,545 B2 | 5/2003 | Stedman et al. | |
| 6,671,630 B2 | 12/2003 | Stedman et al. | |
| 6,701,256 B2 | 3/2004 | Stedman et al. | |
| 7,164,132 B2 | 1/2007 | Didomenico et al. | |
| 7,355,714 B2 | 4/2008 | Wang et al. | |
| 7,385,704 B2 | 6/2008 | Mestha et al. | |
| 7,417,746 B2 | 8/2008 | Lin et al. | |

(Continued)

OTHER PUBLICATIONS

W.J. Williams, and D.H. Stedman, G.A. Bishop, J.R. Starkey, k Ihlenfeldt, "IR Long-Path Photometry, A Remote Sensing Tool for Automobile Emissions", Anal. Chem., 61: 671A-677A, 1989.

(Continued)

*Primary Examiner* — Travis Hunnings
(74) *Attorney, Agent, or Firm* — Philip E. Blair; Fleit Gibbons Gutman Bongini & Bianco P.L.

(57) ABSTRACT

What is disclosed is a system and method for image-based determination of concentration of CO and $CO_2$ in a vehicle's exhaust gas in an emissions testing environment. In one embodiment, the present method involves receiving an IR image of the exhaust plume of a motor vehicle intended to be tested for CO and $CO_2$ concentrations. The IR image has been captured using a mid-wave infrared camera with at least one optical filter tuned to the infrared absorption band of CO and $CO_2$. The images are pre-processed to isolate pixels which contain the exhaust plume. The intensity values of pixels in those isolated regions are normalized and concentrations of CO and $CO_2$ are determined via a calibration curve which relates pixel intensities to concentrations. The concentrations are compared to an emissions standard set for the vehicle to determine whether the vehicle is a gross polluter.

23 Claims, 8 Drawing Sheets

(56) References Cited

U.S. PATENT DOCUMENTS

| | | | |
|---|---|---|---|
| 2003/0025081 A1* | 2/2003 | Edner et al. | 250/339.09 |
| 2013/0079658 A1* | 3/2013 | Cardoso et al. | 600/532 |
| 2013/0185001 A1* | 7/2013 | Cardoso et al. | 702/24 |

OTHER PUBLICATIONS

D.H. Stedman, Automobile Carbon Monoxide Emission, Environ. Sci. & Technol., 23:147-149, 1989.

G.A. Bishop and D.H. Stedman, "Oxygenated Fuels, A Remote Sensing Evaluation", SAE Tech. Paper Series 891116, 1989.

D.H. Stedman and G.A. Bishop, Evaluation of a Remote Sensor for Mobile Source CO Emissions, EPA Publication 600/4-90/032, 1990.

D.H. Stedman and G.A. Bishop, An Analysis of On-Road Remote Sensing as a Tool for Automobile Emissions Control, Final Report to the Illinois Department of Energy and Natural Resources, ILENR/RE-AQ-90/05, 1990.

P.L. Guenther, D.H. Stedman, G.A. Bishop, J.W. Hannigan, J.H. Bean and R.W. Quine, Remote Sensing of Automobile Exhaust, Final Report to the American Petroleum Institute, Publication No. 4538, 1991.

G.A. Bishop, N.E. Holubowitch and D.H. Stedman,Remote measurements of on-road emissions from heavy-duty diesel vehicles in California;Year 1, 2008, Final Report prepared for NREL, Oct. 2009.

C.E. Lyons, D.H. Stedman, Remote Sensing Enhanced Motor Vehicle Emissions Control for Pollution Reduction in the Chicago Metropolitan Area: Siting and Issue Analysis, Final Report to Illinois Department of Energy and Natural Resources, ILENR/RE-AQ-91/15, 1991.

D.H. Stedman and J.E. Peterson, "Find and Fix the Polluters", Chemtech., 22:47-53, 1992.

D.H. Stedman, G.A. Bishop, P.L. Guenther, J.E. Peterson, S.P. Beaton and I.F. McVey, "Remote Sensing of On-Road Vehicle Emissions", Final Report to Coordinating Research Council under Contract No. VE-8-1, 1992.

G.A. Bishop and D.H. Stedman and T.Jessop, Infrared Emission and Remote Sensing, J. Air Waste Manage. Assoc., 42:695-697, 1992.

L.L. Ashbaugh, D.R. Lawson, G.A. Bishop, P.L. Guenther, and D.H. Stedman, R.D. Stephens, P.J. Groblicki, J.S. Parikh, B.J. Johnson, and S.C. Huang, On-Road Remote Sensing of Carbon Monoxide and Hydrocarbon Emissions During Several Vehicle Operating Conditions, Presented at AWMA/EPA Conference on PM10 Standards and Nontraditional Particulate Source Controls, Phoenix, AZ, Jan. 1992.

G.A. Bishop, D.H. Stedman, J.E. Peterson, T.J. Hosick and P.L. Guenther, "A Cost-Effectiveness Study of Carbon Monoxide Emissions Reduction Utilizing Remote Sensing", J. Air Waste Manage. Assoc., 43:978-988, 1993.

D.H. Stedman, G.A. Bishop, Y. Zhang and P. L. Guenther, "Remote Sensing of Automobile Emissions", Traffic Technology International 94, 194-198, UK & International Press, 1994.

P.L. Guenther, D.H. Stedman, G.A. Bishop, S.P. Beaton, J.H. Bean and R.W. Quine, "Hydrodocarbon Detector for the Remote Sensing of Vehicle Exhaust Emissions", Rev. Sci. Instrum., 66:3024-3029, 1995.

Y. Zhang, D.H. Stedman, G.A. Bishop, P.L. Guenther and S.P. Beaton, "Worldwide On-Road Vehicle Exhaust Emissions Study by Remote Sensing", Environ. Sci.Technol., 29:2286-2294, 1995.

D.H. Stedman and G.A. Bishop, "Remote Sensing: A Simpler Way to Reduce Air Pollution", The Commonwealth Foundation, Issue Brief, Sep. 1995.

Y. Zhang, D.H. Stedman, G.A. Bishop, S.P. Beaton, P.L. Guenther and I.F. McVey, "Enhancement of Remote Sensing for Mobile Source Nitric Oxide", J. Air Waste Manage. Assoc., 46:25-29, 1996.

D.H. Stedman and G.A. Bishop, "Measuring the Emissions of Passing Cars", Acc. Chem. Res., 29:489-495, 1996.

P.A. Walsh, J.C. Sagebiel, D.R. Lawson, K.T. Knapp, G.A. Bishop, "Comparison of Auto Emission Measurement Techniques", Sci. Tot. Environ., 189/190:175-180, 1996.

D.H. Stedman, G.A. Bishop, P. Aldrete, R.S. Slott, "On-Road Evaluation of an Automobile Emission Test Program", Environ. Sci. Technol., 31:927-931, 1997.

P. Popp, G.A. Bishop and D.H. Stedman, "Development of a High-Speed Ultraviolet Spectrophotometer, Capable of Real-Time NO And Aromatic Hydrocarbon Detection in Vehicle Exhaust", Proc. of CRC 7th On-Road Vehicle Emissions Workshop, San Diego, CA, Apr. 10, 1997.

D.H. Stedman, G.A. Bishop and P. Aldrete, "On-Road CO, HC, NO and Opacity Measurements", Proc. of CRC 7th On-Road Vehicle Emissions Workshop, San Diego, CA, Apr. 11, 1997.

G.A. Bishop, D.H. Stedman and R.B. Hutton, "Final Technical Report for ITS for Voluntary Emission Reduction: an ITS Operational Test Using Real-Time Vehicle Emissions Detection", Final Report to CDOT, May 1998.

G.A. Bishop and D.H. Stedman, "Automobile Emissions On-Road", John Wiley & Sons, Inc., New York, Ed. Robert A. Meyers, The Encyl. of Environ. Analysis and Remediation, 1:542-555, Mar. 1998.

P.J. Popp and D.H. Stedman, "Remote Sensing of Commercial Aircraft Emissions", Final Report, 1998.

P.J. Popp, G.A. Bishop and D.H. Stedman, "A Method for Commercial Aircraft NOx Emission Measurements", Environ. Sci. Technol., 33:1542-1544, 1999.

P.J. Popp, G.A. Bishop and D.H. Stedman, "Development of a High-Speed Ultraviolet Spectrometer for Remote Sensing of Mobile Source Nitric Oxide Emissions", J. Air Waste Manage. Assoc., 49:1463-1468, 1999.

P.J. Popp, G.A. Bishop and D.H. Stedman, "Remote Sensing of Railroad Locomotive Emissions: A Feasibility Study", Final Report prepared for FHA, Feb. 12, 1999.

D.H. Stedman, "Identification of Polluting Vehicles by Remote Sensing", N.C.S.L., Ground Transportation for the 21st Century, F. Kreith et al, Appendix D:162-164, 1999.

G.A. A Bishop, D.H. Stedman, R.B. Hutton, L. Bohren and N. Lacey, "Drive-by Motor Vehicle Emissions: Immediate Feedback in Reducing Air Pollution", Environ. Sci. Technol., 34:1110-1116, 2000.

K.S. Bradley, K. Brooks, L. Hubbard, P.J. Popp and D.H. Stedman, "Motor Vehicle Fleet Emissions by OP-FTIR", Environ. Sci. Technol., 34:897-899, 2000.

S.S. Pokharel, G.A. Bishop and D.H. Stedman, "Fuel-Based On-Road Motor Vehicle Emissions Inventory for the Denver Metropolitan Area", presented at the International Emission Inventory Conference, Denver, CO. May 2001.

S.S. Pokharel, G.A. Bishop and D.H. Stedman, "Preliminary Studies Using Remote Sensing to Evaluate I/M Effectiveness", Final Report to U.S. EPA, Aug. 2001.

D.H. Stedman and G.A. Bishop, "Opacity Enhancement of the On-Road Remote Sensor for HC, CO and NO", Final Report prepared for CRC-E56-2, Feb. 2002.

D.H. Stedman and G.A. Bishop, "On-Road Emissions Measured by Remote Sensing", Int. Powertrain Rev., Apr. 4-5, 2005.

G.A. Bishop, D.A. Burgard, T.R. Dalton and D.H. Stedman, "In-use Emission Measurements of Snowmobiles and Snowcoaches in Yellowstone National Park", Final Report prepared for the National Park Service, Jan. 2006.

D.A. Burgard, G.A. Bishop, R.S. Stadtmuller, T.R. Dalton and D.H. Stedman, "Spectroscopy Applied to On-Road Mobile Source Emissions", Appl. Spectrosc., 60:5:135A-148A, 2006.

D.A. Burgard, G.A. Bishop, D.H. Stedman, V.H. Gessner and C. Daeschlein, "Remote Sensing of In-Use Heavy-duty Diesel Trucks", Environ. Sci. Technol., 40:6938-6942, 2006.

G.A. Bishop, R. Stadtmuller, D.H. Stedman and J.D. Ray, "Portable Emission Measurements of Snowcoaches and Snowmobiles in Yellowstone National Park", Final Report prepared for the National Park Service, Jan. 2007.

Cardoso et al., "Vehicle Emissions Testing and Toll Collection System", U.S. Appl. No. 13/352,683, filed Jan. 18, 2012.

Cardoso et al., "Minimally Invasive Image-Based Determination of Carbon Dioxide (CO2) Concentration in Exhaled Breath", U.S. Appl. No. 13/246,560, filed Sep. 27, 2011.

* cited by examiner

US 8,854,223 B2

IMAGE-BASED DETERMINATION OF CO AND $CO_2$ CONCENTRATIONS IN VEHICLE EXHAUST GAS EMISSIONS

CROSS REFERENCE TO RELATED APPLICATION

The present patent application is a continuation-in-part of commonly owned and co-pending U.S. patent application Ser. No. 13/352,683 entitled: "Vehicle Emissions Testing And Toll Collection System", by Cardoso et al., which is incorporated herein in its entirety by reference.

TECHNICAL FIELD

The present invention is directed to systems which use an infrared camera with filters tuned to the infrared absorption band of CO and $CO_2$ molecules to capture images of the exhaust of a motor vehicle and to methods for analyzing those images to determine concentrations of CO and $CO_2$ in the vehicle's exhaust gas emissions.

BACKGROUND

Government regulations on car emissions require an approved test facility to monitor car emissions. Emissions testing is typically performed every one or two years depending on the State regulations regarding testing schedules. Testing is usually performed as a requisite to vehicle registration. An estimated two billion dollars is spent annually by car owners performing maintenance on their vehicles in order to pass an emissions test. It is desirable to be able to identify gross pollutant vehicles. A gross pollutant vehicle is usually less efficient and is likely to have mechanical issues.

What is needed in this art is a system and method for video-based determination of concentrations of CO and $CO_2$ in a vehicle's exhaust gases in order to determine whether the vehicle is a gross polluter.

INCORPORATED REFERENCES

The following U.S. Patent Application is incorporated herein in its entirety by reference.

"Minimally Invasive Image-Based Determination Of Carbon Dioxide ($CO_2$) Concentration In Exhaled Breath", U.S. patent application Ser. No. 13/246,560, by Cardoso et al.

BRIEF SUMMARY

What is disclosed is a system and method for video-based determination of concentrations of CO and $CO_2$ in a vehicle's exhaust gases in order to determine whether the vehicle is a gross polluter. As more fully described herein, the present system and method comprises a mid-wave infrared camera with filters tuned to the infrared absorption band of CO and $CO_2$ molecules to capture images of the exhaust of a motor vehicle, an image pre-processing algorithm to isolate regions of pixels in the images containing the exhaust plume, and a method for determining CO and $CO_2$ concentration levels using intensity values of pixels in those isolated regions. The teachings hereof readily find their uses in a remote sensing, non-cooperative vehicle emissions testing environment.

One embodiment of the present method for image-based determination of CO and $CO_2$ concentrations in a vehicle's exhaust involves the following. An IR image is received of the exhaust plume of a motor vehicle intended to be emissions tested for CO and $CO_2$ concentrations. The IR image has been captured using a mid-wave infrared camera with filters tuned to the infrared absorption band of CO and $CO_2$ molecules. The images are pre-processed to isolate regions of pixels in the image containing the vehicle's exhaust plume. Concentrations of CO and $CO_2$ are determined via a calibration curve which relates the intensities of pixels in the isolated regions to concentration levels. The determined concentration levels are compared to an emissions standard set for that vehicle and a determination is made whether the vehicle is a gross polluter. In one embodiment, a vehicle is a gross polluter if any of the concentrations of CO and $CO_2$ determined for that vehicle is at least twice the limit set by the emissions standard for this vehicle's make, model and year.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
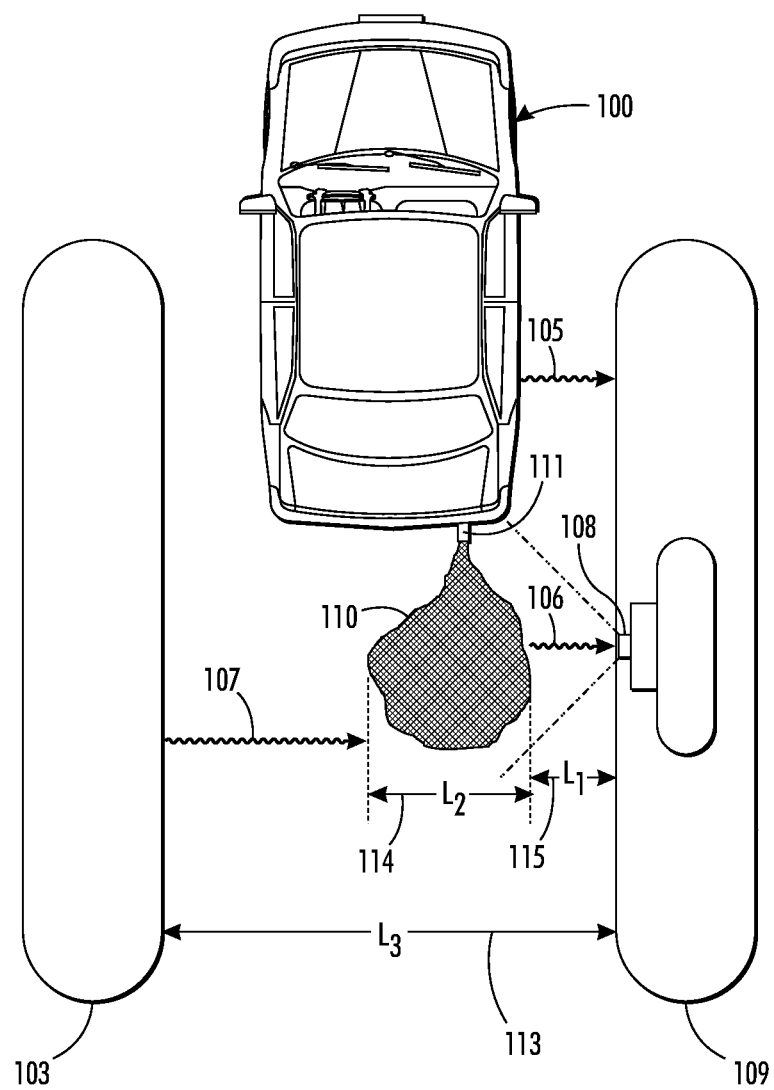
FIG. 1 illustrates a vehicle passing through a lane of an emissions testing structure wherein a mid-wave infrared camera is used to capture infrared images of the vehicle's exhaust plume for processing in accordance with the teachings hereof.

What is disclosed is a system and method for video-based determination of concentrations of CO and $CO_2$ in a vehicle's exhaust gases. As more fully described herein, the present system broadly comprises a mid-wave infrared (MWIR) camera, and the present method broadly comprises a video image pre-processing algorithm and a parameterized model which relates pixel intensities to gas concentration levels.

NON-LIMITING DEFINITIONS

A "motor vehicle" or simply "vehicle" refers to any motorized vehicle with an internal combustion engine which burns a fuel such as: gas/petrol, diesel, natural gas, ethanol, methane, fuel oil, bio-fuels, and the like.

An "infrared image" is either a still image or a video stream captured of a motor vehicle intended to be tested for concentrations of CO and $CO_2$ gases in accordance with the teachings hereof. A single frame of a fully-populated infrared image consists of an array of pixels with each pixel having respective intensity values measured at a particular wavelength band of interest.

A "mid-wave infrared (MWIR) camera", as used herein, has two embodiments. A first mid-wave infrared camera has a sensitivity band in the range of 4.0 to 4.5 μm to capture intensity values of pixels in a vehicle's exhaust plume for a determination of $CO_2$ concentration levels. A second mid-wave infrared camera has a sensitivity band in the range of 4.5 to 5.0 μm to capture intensity values of pixels in the exhaust plume for a determination of CO concentrations. In different embodiments, one or both of the cameras have outputs for outputting reflectance values on a per-channel basis, and a processor and a storage device for processing and storing image data. Such devices generally have the ability to deliver a digital and/or an analog output for display on a monitor. Both embodiments of the MWIR cameras may comprise a single imaging device. The MWIR cameras hereof have spectral band-pass filters to allow light emitted by roto-vibrational modes of CO and $CO_2$ molecules to enter the lens of the camera and narrow band-pass filters which increase the contrast of CO or $CO_2$ relative to background radiation in the scene of the image.

A "filter", as used herein, effectuates the transmittance of a desired wavelength band while rejecting wavelengths outside the band such that the light received by the optics of the imaging device is restricted to the bands of interest. The filters can be a thin film filter for simultaneous multi-image capture of different spectral bands with a mosaic pattern between filters. A thin film filter has a coating which is applied to the optics during the optical fabrication process. Thin film coatings can be, for example, Calcium Fluoride (CaF2), Barium Flouride (BaF2), Zinc Selenide (ZnSe), Zinc Sulfide (ZnS), to name a few. Additional coatings can effectuate anti-reflection and attenuation. Thin film filters are readily available in various streams of commerce. For example, the Reynard Corporation has experience working with a wide array of thin film coatings for infrared applications including infrared materials supplied by their customers. The filters can be a Fabry-Perot filter for simultaneous multi-image capture of different spectral bands of an image. Embodiments of Fabry-Perot filters are disclosed in the above-incorporated references: U.S. Pat. No. 7,355,714 entitled: "Reconfigurable MEMS Fabry-Perot Tunable Matrix Filter Systems And Methods", U.S. Pat. No. 7,385,704 entitled: "Two-Dimensional Spectral Cameras And Methods For Capturing Spectral Information Using Two-Dimensional Spectral Cameras", and U.S. Pat. No. 7,417,746 entitled: "Fabry-Perot Tunable Filter Systems And Methods". The filter can be a filter wheel assembly comprising an array of different filters rotatably mounted onto the camera to effectuate non-simultaneous multi-image capture of different spectral bands. The filter wheel is usually manually rotated but, in different configurations, can be made electro-mechanically rotatable. Filter wheels comprising customer provided filters are readily available in various streams of commerce.

An "exhaust plume" refers to a downwind pattern of gases expelled out an exhaust pipe of a motor vehicle. An example exhaust plume is shown in 110 of FIG. 1.

"Isolating a region of pixels" containing the exhaust plume means processing the infrared image, either manually or automatically, such that pixels in the image that are of the vehicle's exhaust plume can be extracted for processing. The region of pixels may be identified by defining, for example, a particular location in the image where pixels of the vehicle's exhaust gas plume are likely to reside in the image. Such locations may be, for instance, the center of the image or an edge or corner of the image. Regions of pixels of the vehicle's exhaust plume may be isolated in the image relative to a known or estimated location of the vehicle's exhaust pipe, or relative to a feature of the vehicle such as the bumper, wheel, or based upon a prior knowledge about a vehicle's make, model, and year and where the exhaust plume is likely to be in the image. Regions containing pixels of the vehicle's exhaust plume may be determined in the image relative to the position of the camera's used to capture the image such as, for instance, the camera's angle, placement, height, field of view, lens speed, and the like. Such information may be used in conjunction with the vehicle's speed determined at the instant the image was captured. Regions of pixels of the vehicle's exhaust plume in the images can be manually selected by a user viewing the image(s) on a monitor display and using, for instance, a pointing device such as a mouse to draw a rubber-band box around a region where the exhaust plume can be observed or where the exhaust plume is likely to be. In various embodiments, the selected regions are communicated to a workstation wherein pixels of the isolated regions are processed for gas concentration levels in accordance with the teachings hereof.

A "reference region" is a region in the image of the motor vehicle which is used to obtain a value of a known radiance. As with the region used to isolate pixels containing the exhaust plume of the vehicle, the reference region can be manually selected or automatically identified in the image using similar techniques. Alternatively, a reference radiance region in the camera's field of view is pre-selected or pre-recorded when no vehicle is present using, for example, an object or background with a known emissivity and temperature.

"Carbon monoxide" (chemical formula CO) is a colorless, odorless, and tasteless gas that is slightly lighter than air. A carbon monoxide molecule consists of one carbon atom and one oxygen atom connected by a triple covalent bond. It is the simplest oxocarbon. CO absorbs strongly in the infrared at approximately 4.65 μm and ranges from 4.5 to 5.0 μm. Carbon monoxide is produced from the partial oxidation of carbon-based fuels. Typically, a vehicle is considered clean if it has less than 0.1% of CO emissions. It should be appreciated that not all vehicles emit CO and not all vehicles emit CO at a level that can be detected.

"Carbon dioxide" (chemical formula $CO_2$) is a naturally occurring gas that exists in the Earth's atmosphere at a concentration of approximately 0.039% by unit volume at standard temperature and pressure. A molecule of carbon dioxide consists of two oxygen atoms covalently bonded to a single atom of carbon. $CO_2$ absorbs strongly in the infrared around 4.3 μm and ranges from 4.0 to 4.5 μm. Analogously to CO, $CO_2$ has more than one atom and can present molecular vibration. Temperature determines the amplitude of the molecular vibrations. Thermal energy drives the various molecular roto-vibrational modes allowing them to emit a detectable radiance. The frequencies of these molecular roto-vibrational modes can be calculated from the mass of the atoms and the strength of the bonds.

A "gross polluter", as used herein, is a vehicle with a concentration of either CO and $CO_2$ determined in the vehicle's exhaust plume to be at least twice the limit set by an emissions standard for that particular vehicle make, model and year. Truck emissions standards are different than standards set for passenger cars. Older vehicles are not held to the same emissions standards as newer vehicles.

"Emissions standards" are set for vehicles by a government agency tasked with defining standards for vehicle emissions, and are used herein to determine whether a vehicle is a gross polluter. The Clean Air Act, enacted in 1970, gave the U.S. Environmental Protection Agency (EPA) broad powers to regulate vehicle emissions. Emissions standards have become stricter in recent years. In 2007, a U.S. Supreme Court decision gave the EPA authority to regulate emissions of carbon dioxide. In 2010, the EPA implemented a rule requiring many different types of motor vehicles to meet average emissions with a concentration of 250 grams/mile of $CO_2$. The EPA's Emissions Standards Reference Guide is available for download at their website [www.epa.gov].

An "emissions enforcement authority" is an authority such as, for example, a Department of Motor Vehicles, State Police, or other enforcement agency, tasked with checking motor vehicles on a pre-defined schedule for compliance with State and Federal exhaust gas emissions standards. In accordance with various aspects of the teachings hereof, if a motor vehicle does not meet the emissions standards set for that vehicle then the emissions enforcement authority is notified. They can thereafter issue a citation to a registered owner of the vehicle; deduct a cost of the emissions testing from an account associated with the vehicle's electronic tag, invoice the registered owner of the vehicle for the emissions testing; and/or simply notify the vehicle's registered owner of the test results.

An "electronic tag" is a small integrated circuit with specialized onboard components for communicating with a sensor device. The vehicle's electronic tag is affixed to the vehicle, typically the inside of the front windshield. In one embodiment, an electronic tag is a RFID tag, as are known in the arts, which modulates/demodulates a radio frequency (RF) signal. RFID tags are often used to automatically collect tolls from a pre-funded account associate with that tag. According to various embodiments hereof, the vehicle's electronic tag communicates information about the motor vehicle. The electronic tag may be updated with new or additional information from time to time. Such an update may occur manually or automatically. Information about the motor vehicle is intended to be broadly construed to include, for example, the vehicle's identification number, year/make/model, the registered owner's contact such as name, address, phone, and email, and the like, along with the date of the vehicle's last emissions test.

Example Emissions Testing System

Reference is now being made to FIG. 1 which illustrates a vehicle 100 passing through a lane of an emissions testing structure wherein a mid-wave infrared camera is used to capture infrared images of the vehicle's exhaust plume for processing in accordance with the teachings hereof. As the vehicle trips a sensor (not shown), a signal is sent to mid-wave infrared cameras 108 fixed to wall 109 to capture infrared images of the vehicle's exhaust plume 110 coming out exhaust pipe 111, at a pre-calculated instance depending based upon the vehicle's speed. High speed mid-wave infrared camera 108 (with suitable configurations with and without illuminators and mirrors), captures images of the vehicle's exhaust plume at the instance the exhaust plume passes through the camera's field-of-view. The captured images are analyzed for concentrations of either of CO or $CO_2$ molecules. For discussion purposes, the following discussion for determining concentrations is given with respect to $CO_2$ but, a similar analysis applies to a determination of the concentration of CO. Variables such as temperatures, atmospheric pressure, distances, etc., can all be measured apriori. Some values can be measured directly from a background surface in the image using a thermometry function of the camera.

CO2 Concentration Determination

The radiance of $CO_2$ in the spectral window of observation depends on several factors: atmospheric pressure (P), temperature (T) in Kelvin, volume mixing ratio (vmr), and depth of sample (L). Atmospheric pressure needs to be accounted for because molecular resonances are broadened by collisions with background molecules due to pressure. Atmospheric pressure is 1 bar (1013.25 mbars) at sea level. The volume mixing ratio (vmr) is the fractional number of molecules of a species in a volume. In practice, the vmr is the percentage of gas of interest that can be converted into any other unit of partial volume such as ppm or mmHg just by multiplying by a corresponding factor. Individual vmrs and their sums must be between 0 and 1. If the vmr sums to less than 1, the rest of the gas in the volume is assumed to be optically transparent. Line shapes for molecules with a vmr less than 1 are air-broadened. An example depth of the sample (L) is shown at $L_2$ (at 114). The deeper the plume, the more radiance it emits up to the limit where it saturates by self-absorption. If the thickness L2 of the exhaust vapor is unknown, range of 15 cm to 30 cm should be considered. For absolute measurements of $CO_2$ concentration, the depth of the plume is preferably measured with a high degree of accuracy.

Radiances $R_o$ along radiance path 105 are from the side of the vehicle. The vehicle has an emissivity ($e_v$) and a temperature ($T_v$) that gives a blackbody radiance $R_{BB}$ when corrected for the distance 115 to camera 108, the ambient $CO_2$ concentration, the ambient atmospheric pressure, and the ambient temperature. Radiances $R_{CO_2}$ along radiance path 106 are from the exhaust plume 110. Radiances $R_o$ along radiance path 107 are emitted from background wall 103 and other objects that may be present. $R_o$ is a value already corrected for the distance 113, 114, 115 to camera 108, the ambient $CO_2$ concentration, the ambient atmospheric pressure and ambient temperature. Background wall 103 as an emissivity ($e_w$) and a temperature ($T_w$). The temperature of the wall ($T_w$) and the temperature of the vehicle ($T_v$) can be measured using a thermometry function of the same camera used for $CO_2$ measurements. Radiances $R_{BB}$ are from a reference object whose line of sight connecting to the camera does not intercept the exhaust plume.

Intensity ($I_o$) is due to background $CO_2$, far-away objects, or wall black-body radiation. Intensity ($I_{BB}$) is from black-body radiation detected from the reference region. Intensity ($I_{co2}$) is from the $CO_2$ in the region containing the exhaust plume. Intensities $I_o$, $I_{BB}$, and $I_{CO_2}$ are due to their respective radiances $R_o$, $R_{BB}$, and $R_{CO_2}$, emitted by the objects they represent (plus image noise due to scattered light and other sources of noise). Since the digital intensities on the images are not calibrated for radiance, a known radiance is used as a reference to calibrate the camera's digital intensities to a localized radiance. Radiance data can be obtained from the molecular spectral information of the High-Resolution Transmission Molecular Absorption Database (HITRAN) that is maintained by the Atomic and Molecular Physics Division of the Harvard-Smithsonian Center for Astrophysics. HITRAN is a compilation of spectroscopic parameters that a variety of computer codes use to predict and simulate the transmission and emission of light in the atmosphere. The HITRAN database is downloadable from Harvard's website [http://www.cfa.harvard.edu/hitran/]. The HITRAN database can be processed using a custom-made computer code or a commercial software such as Spectral Calc which simulates particular conditions such as temperature, pressure, volume mixing ratio, and volume depths/distances.

Gas concentrations are determined using a transfer function that converts intensities ($I_{CO_2}$) measured from pixels in the isolated region of the vehicle's exhaust plume into calculated radiances. Knowledge of the intensity $I_{CO_2}$, allows one to compute the $CO_2$ concentration by solving, for example, Eqs. (1) through (3) for $R_{CO_2}$.

Assuming a common level of noise N, the relationship between the intensities and radiances can be represented by:

$$I_o = \alpha(R_o + N) \quad (1)$$

$$I_{BB} = \alpha(R_{BB} + N) \quad (2)$$

$$I_{CO_2} = \alpha(R_{CO_2} + N) \quad (3)$$

where $\alpha$ is the gain of the camera. The unknowns are N and $R_{CO_2}$.

Solving Eqs. (1) through (3) for $R_{CO_2}$ produces the following relationship:

$$R_{CO_2} = \frac{R_{BB}(I_{CO_2} - I_o) + R_o(I_{BB} - I_{CO_2})}{(I_{BB} - I_o)} \quad (4)$$

where $R_o$ and $R_{BB}$ are calculated from parameters of the HITRAN database as given by:

$$R_o = R_o(T_{wall}, e_{wall}, L_1, L_2, T_{ambient}, L_3, P, VMR_{CO_2\text{-background}}) \quad (5)$$

$$R_{BB} = R_{BB}(T_v, e_v, T_{ambient}, L_3, P, VMR_{CO_2\text{-background}}) \quad (6)$$

In those instances where the parameters above are known (without knowledge of the concentration), $R_{CO_2}$ can be used to determine the $CO_2$ concentration via a transfer function given by:

$$R_{CO_2} = R_{CO_2}(T_{wall}, e_{wall}, L_1, T_{ambient}, L_2, L_3, P, VMR_{CO_2\text{-exhaust}}). \quad (7)$$

It should be appreciated that, since Eq. 5 defines $R_o$ as a function of known parameters and since Eq. 7 gives a relationship between $R_{CO_2}$ and $VMR_{CO_2\text{-exhaust}}$, the values $R_o$, $R_{BB}$ and the transfer function $R_{CO_2}(VMR_{CO_2\text{-exhaust}})$ can be readily substituted into Eq. (4) leaving only $VMR_{CO_2\text{-exhaust}}$ which therefore has a unique solution. It should also be appreciated that the above-described determination of concentration of $CO_2$ applies, in a similar manner, to the determination of the concentration of CO. Therefore, a discussion as to the determination of $VMR_{co}$ has been omitted.

Flow Diagram of a First Embodiment

Figure 2:
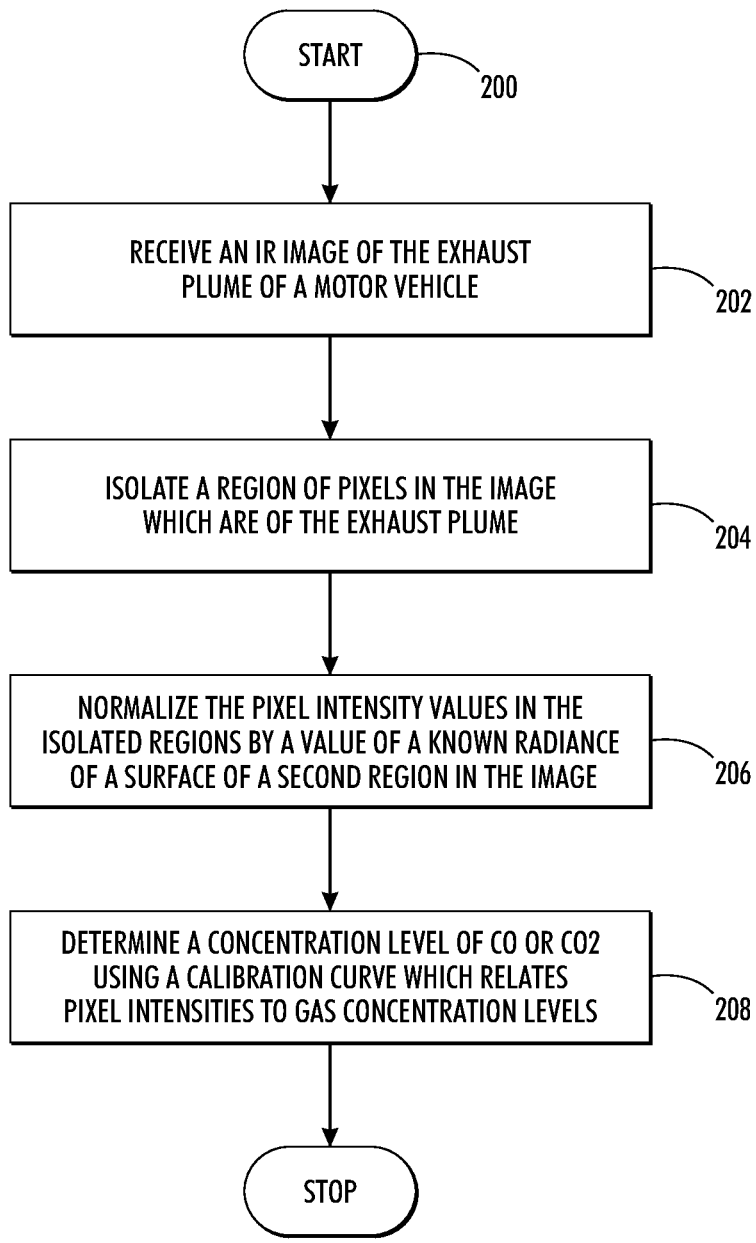
FIG. 2 is a flow diagram of one embodiment of the present method for image-based determination of CO and $CO_2$ concentrations in vehicle exhaust gas emissions.

Reference is now being made to the flow diagram of FIG. 2 which illustrates one example embodiment of the present method for image-based determination of CO and $CO_2$ concentrations in the vehicle's exhaust gas in an emissions testing environment. Flow processing begins at step 200 and immediately proceeds to step 202.

At step 202, receive at least one IR image of an exhaust plume of a motor vehicle. The received images have been captured using a mid-wave infrared camera having at least one optical filter tuned to the infrared absorption band of an emissions gas comprising at least one of: CO and $CO_2$.

Figure 3:
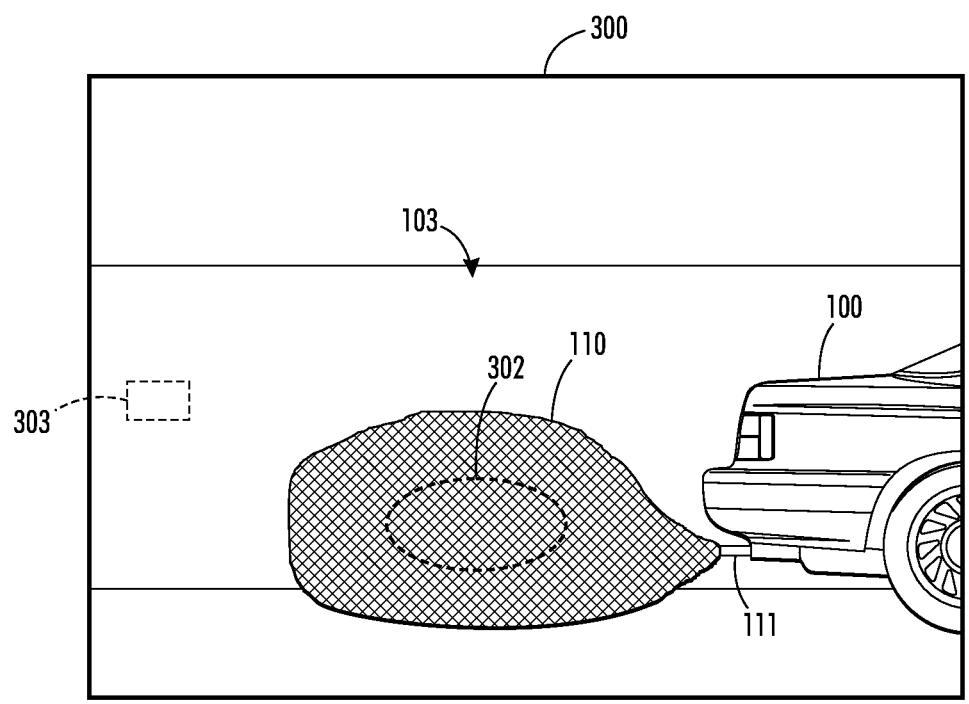
FIG. 3 illustrates an example infrared image of the exhaust plume of the vehicle of FIG. 1.

At step 204, isolate a region of pixels of the exhaust plume in the image. FIG. 3 shows an example infrared image 300 of the exhaust plume 110 of the vehicle 100 of FIG. 1 wherein a first region 302 containing pixels of the exhaust plume has been isolated.

At step 206, normalize the intensity values of pixels in the isolated region by a value of a known radiance. In FIG. 3, a reference region 303 has been isolated in the infrared image 300 which contain pixels of a background surface (wall 103) in the image. The background surface has a known temperature and emissivity such that the intensity values of pixels of the isolated region containing the exhaust plume can be normalized by the value of a known radiance.

At step 208, determining a concentration of the emissions gas in the exhaust plume using a calibration curve which relates pixel intensities to gas concentrations. Methods for determining concentrations of CO and $CO_2$ are discussed with respect to FIG. 1. In this embodiment further processing stops.

In another embodiment, the concentration is compared to an emissions standard set for this vehicle to determine whether this vehicle is a gross polluter. In this embodiment, a gross polluter is a vehicle with a concentration of carbon dioxide and/or carbon monoxide exceeding the emissions standards set for this vehicle make, model, and year, by at least a factor of two. If it is determined, as a result of the comparison, that the vehicle is a gross polluter then a notification is provided to an emissions enforcement authority. The emissions enforcement authority can thereafter notify the registered owner of the vehicle or issue a citation.

Flow Diagram of a Second Embodiment

Figure 4:
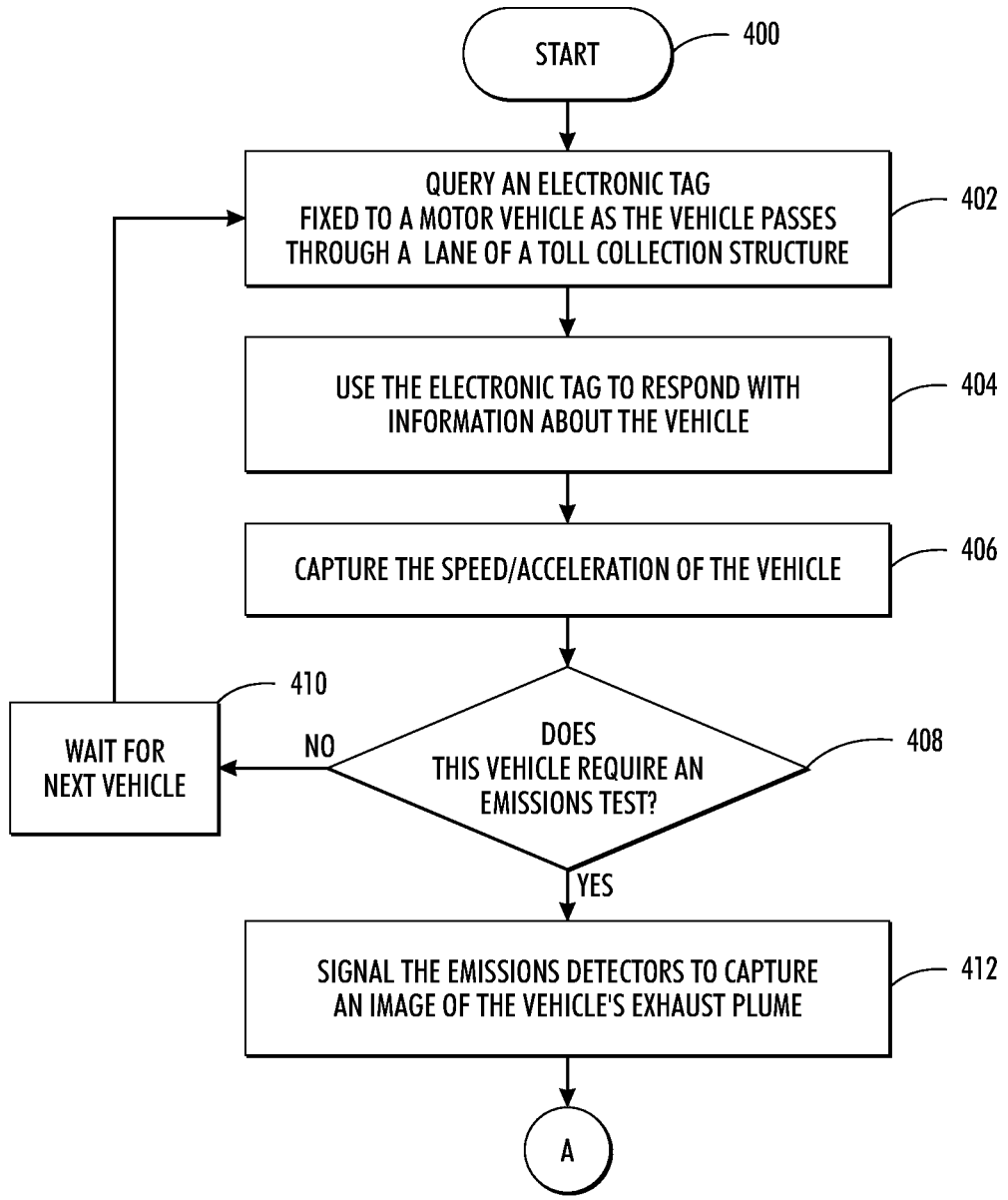
FIG. 4 is a flow diagram illustrating one embodiment of using a vehicle's electronic tag to facilitate emissions testing in accordance with the teachings hereof.

Reference is now being made to the flow diagram of FIG. 4 which illustrates one embodiment of using a vehicle's electronic tag to facilitate testing of the vehicle's exhaust emissions. Flow begins at step 400 and processing immediately proceeds to step 402.

At step 402, a sensor is used to query an electronic tag fixed to a motor vehicle as the vehicle passes through a lane of an emissions testing structure. One such structure is shown and discussed with respect to FIG. 1.

At step 404, the vehicle's electronic tag responds with information about the vehicle. In one embodiment, information provided by the electronic tag in response to the sensors query includes the vehicle's license plate number, the vehicle's year/make/model, the vehicle's registration information, a date of the vehicle's last emissions test, and the vehicle owner's name and address. In another embodiment, the electronic tag responds with an account identification which, in turn, is used to access records of information about the vehicle from a database. Such records can be provided either directly or indirectly from the Department of Motor Vehicles which gathers, collates, and retains such information.

At step 406, the vehicle's speed/acceleration is captured or otherwise acquired. In one embodiment, speed/acceleration detectors comprise a plurality of sensors which are tripped or activated by the passing of the vehicle. In another embodiment, the vehicle's speed/acceleration is provided by the vehicle's electronic tag which has been placed in communication with various speed/acceleration sensors onboard the vehicle such as accelerometers and/or the vehicle's speedometer.

At step 408, a determination is made whether the vehicle requires an emissions test in accordance with the teachings hereof. Such a determination is based, at least in part, upon the response by the vehicle's electronic tag as to whether the vehicle has a current emissions test. If the vehicle does not require emissions testing then, at step 410, the method awaits for sensors to indicate the arrival of a next vehicle. Upon arrival of the next vehicle, processing continues with respect to step 402 wherein the electronic sensor queries the next vehicle's electronic tag. If, on the other hand, this vehicle requires an emissions test then, at step 412, a signal is sent to the emissions detectors to capture an image of the exhaust plume emitted from an exhaust pipe of the vehicle.

Figure 5:
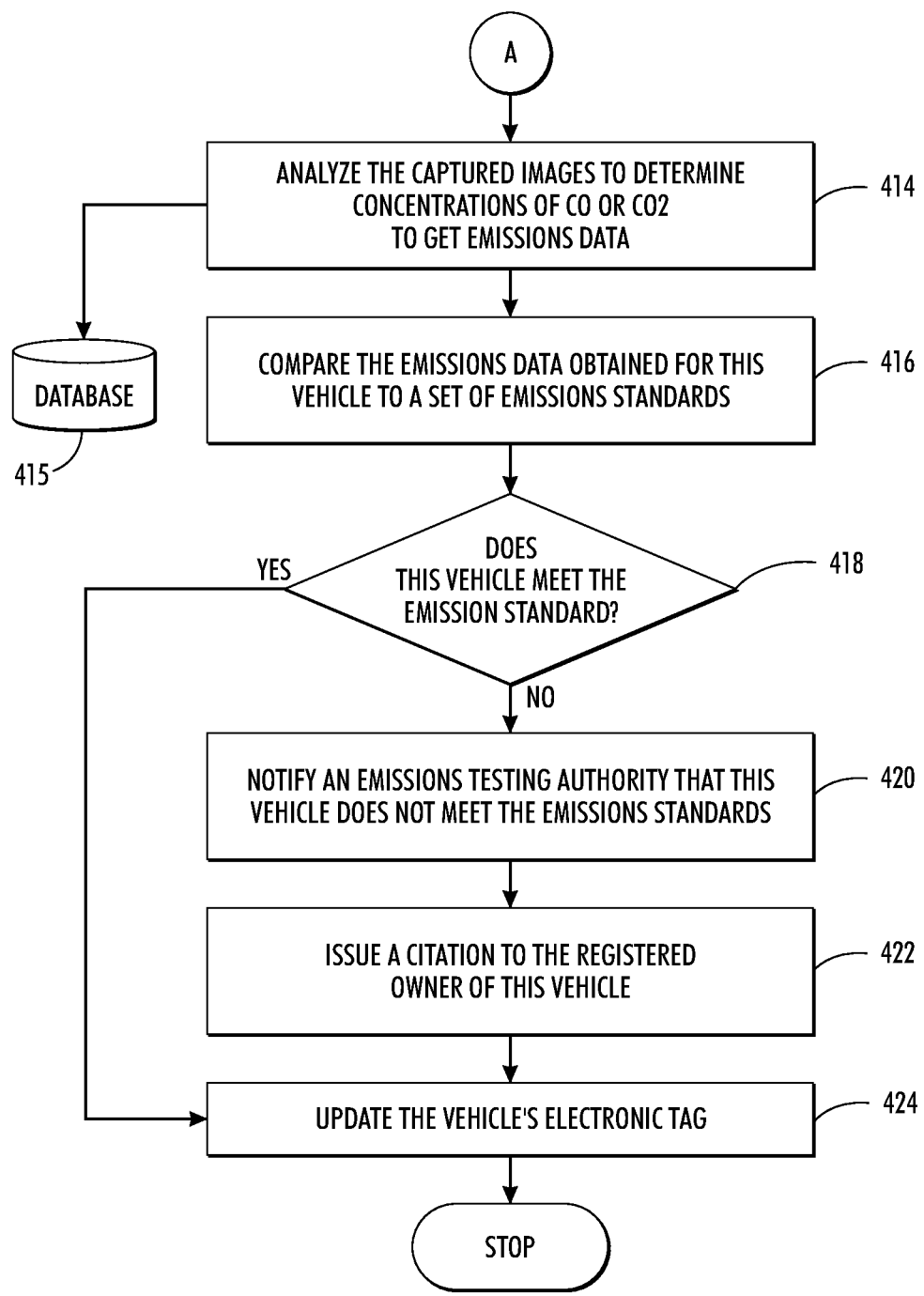
FIG. 5 is a continuation of the flow diagram of FIG. 4 with flow processing continuing with respect to node A.

Reference is now being made to the flow diagram of FIG. 5 which is a continuation of the flow diagram of FIG. 4 with flow processing continuing with respect to node A.

At step 414, the captured images are analyzed for concentrations of CO and $CO_2$ gases. A result of the analysis produces emissions data. The emissions data is stored to database 415.

At step 416, the emissions data is then compared to an emissions standard set for this particular vehicle. The emissions standards may be retrieved from a memory or storage device having been pre-loaded in advance of bringing the emissions testing system online.

At step 418, a determination is made whether the vehicle meets the emissions standards set for this vehicle. If the vehicle does not meet the emissions standards then, at step 420, an authority is notified.

At step 422, a citation is issued to the vehicle's registered owner in response to the vehicle not meeting the emissions standards. The cost of the citation issued to the vehicle's registered owner can be scaled according to the emissions test results and, at step 424, the vehicle's electronic tag is updated. If, at step 418, the vehicle meets or exceeds the emissions standards set for this vehicle then, at step 424, the vehicle's electronic tag is updated with the test data, test date, and test results. Thereafter, in this embodiment, flow processing stops. Alternatively, flow processing continues with respect to step 410 wherein the method waits for the arrival of a next vehicle. Upon arrival of the next vehicle, processing repeats in a similar manner. In other embodiments, a cost of the emissions test is automatically deducted from the user's account associated with that tag. The registered owner of the vehicle may be provided with a notification as to the result of the emissions test. Such a notification can take the form of a text message being sent to a phone number of the owner of record, or a pre-recorded voice, text, or video message can be sent to the owner's email address or phone. A message may be sent to the vehicle's ON-STAR system (where equipped) which proceeds to audibly recite the message to the vehicle's driver. A person may contact the vehicle's owner directly. Such embodiments are intended to be encompassed by the appended claims.

It should be understood that the flow diagrams depicted herein are illustrative. One or more of the operations illustrated in the flow diagrams may be performed in a differing order. Other operations may be added, modified, enhanced, or consolidated. Variations thereof are intended to fall within the scope of the appended claims. All or portions of the flow diagrams may be implemented partially or fully in hardware in conjunction with machine executable instructions.

Block Diagram of Emissions System

Figure 6:
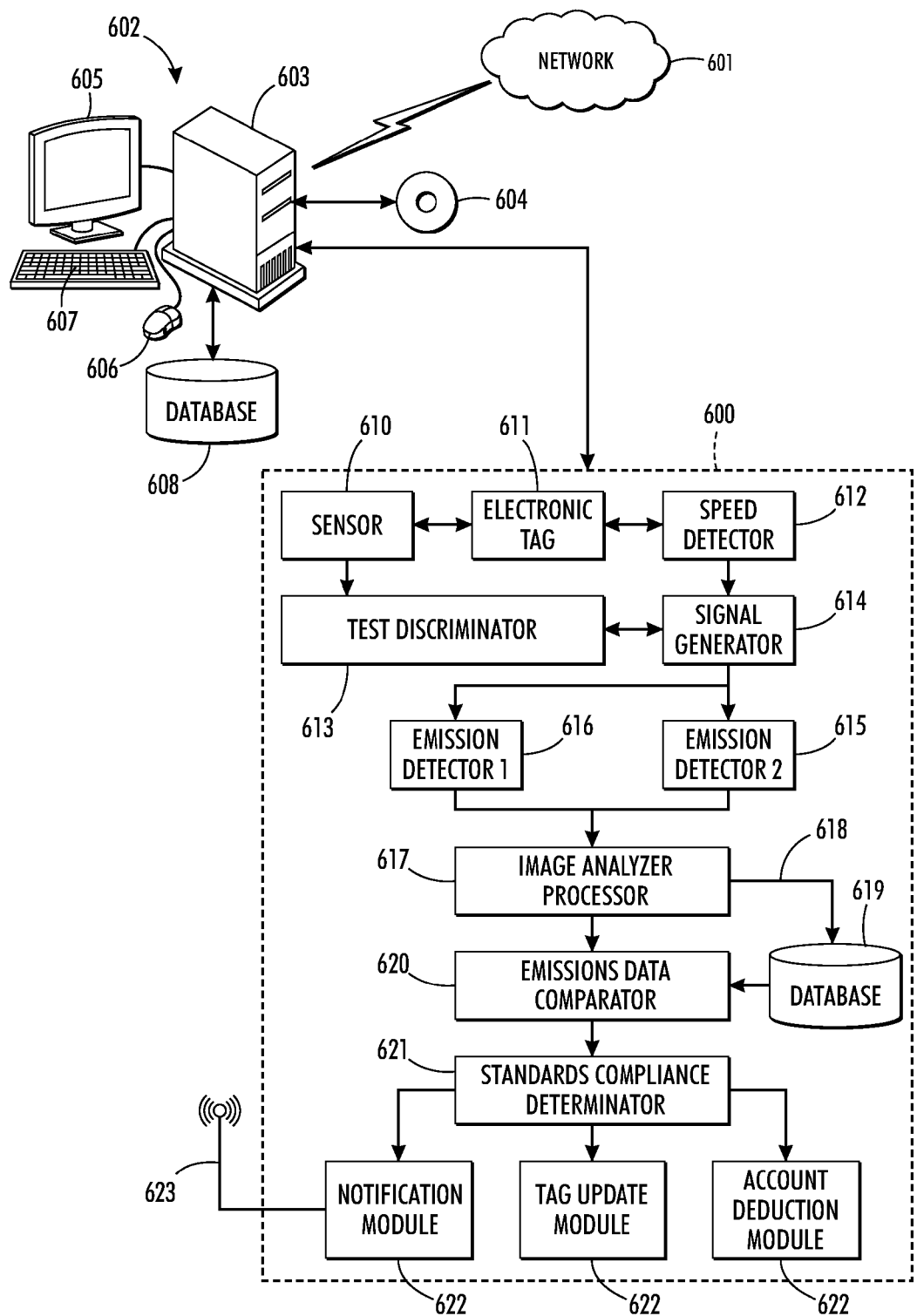
FIG. 6 is a functional block diagram of an example networked system for implementing various aspects of the present method described with respect to the flow diagrams of FIGS. 3, 4 and 5.

Reference is now being made to FIG. 6 which illustrates a functional block diagram of one embodiment of a networked example emissions testing system wherein various aspects of the present system and method are performed. The system illustrates a plurality of modules, processors, devices, and components placed in networked communication with a computer workstation.

Workstation 602 includes a hard drive (internal to computer housing 603) which reads/writes to a computer readable media 604 such as a floppy disk, optical disk, CD-ROM, DVD, magnetic tape, etc. Case 603 houses a motherboard with a processor and memory, a communications link such as a network card, graphics card, and the like, and other software and hardware to perform the functionality of a computing device as is generally known in the arts. The workstation includes a graphical user interface which, in various embodiments, comprises display 605 such as a CRT, LCD, touch screen, etc., mouse 606, and keyboard 607. It should be appreciated that workstation 602 has an operating system and other specialized software configured to display a wide variety of numeric values, text, scroll bars, pull-down menus with user selectable options, and the like, for entering, selecting, or modifying information displayed on display 605. The embodiment shown is only illustrative. Although shown as a desktop computer, it should be appreciated that computer 602 can be any of a laptop, mainframe, client/server, or a special purpose computer such as an ASIC, circuit board, dedicated processor, or the like. Any of the Information obtained from any of the modules of system 600 including various characteristics of any of the sensors can be saved to database 608. Information about the document or the sensors may be entered by a user using the graphical user interface of computer 602. Any information may be communicated to a remote device over network 601 for storage or processing. Network 601 is shown as an amorphous cloud. A detailed discussion as to the operation of any specific network configuration has been omitted. Data is transferred between devices in the network in the form of signals which may be in any combination of electrical, electro-magnetic, optical, or other forms. Signals are transmitted by wire, cable, fiber optic, phone line, cellular link, RF, satellite, or any other medium or communications link known in the arts.

System 600 is shown comprising a Sensor 610, Electronic Tag 611, and a Speed/Acceleration Detection Module 612. As discussed with respect to step 402 of the flow diagram of FIG. 4, Sensor 610 queries the vehicle's Electronic Tag 611 which responds with information about the vehicle. Speed/Acceleration Detector Module 612 captures the vehicle's speed/acceleration. Test Discriminator Processor 613 determines whether this particular vehicle requires an emissions test. Such a determination is based, at least in part, upon the response by the vehicle's electronic tag as to whether the vehicle has a current emissions test on record. If this vehicle requires an emissions test then Signal Generator 614 signals Emissions Detectors 615 and 616 to capture, at a predetermined moment, infrared images of the vehicle's exhaust plume. Detectors 615 and 616 are a first and second mid-wave infrared cameras. A first mid-wave infrared camera has a sensitivity band in the range of 4.0 µm to 4.5 µm to capture intensity values of pixels of $CO_2$ in a vehicle's exhaust plume. A second mid-wave infrared camera has a sensitivity band in the range of 4.5 µm to 5.0 µm to capture intensity values of pixels of CO in the exhaust plume. These two cameras may comprise a single infrared imaging device. One such image of the vehicle's exhaust plume is shown and discussed with respect to image 300 of FIG. 3. Signal Generator alternatively receives the speed data directly from Speed Detection Module 612. The captured infrared images are provided to Image Analyzer Processor Module 617 which analyzes the images for concentrations of one or both of carbon monoxide and carbon dioxide. A result of the analysis produces Emissions Data 619 which is stored to Storage Device 619. Data Comparator 620 receives the emissions data and compares the data to emissions standards which have been retrieved from Database 619. Standards Compliance Determinator 621 determines whether the vehicle meets the standard. If the vehicle does not meet the emissions standards then Notification Module 622 proceeds to notify an authority using, for example, Transmission Element 623, which may assume any of a wide variety of communication elements depending on the design of the system wherein the teachings hereof find their intended uses. Module 622 may further provide a notification of the test results to the vehicle's registered owner, in accordance with various embodiments hereof. Such a notification can take the form of a text message being sent to a phone number of the owner of record, or a pre-recorded voice, text, or video message can be sent to the owner's email address or phone. A message may be sent to the vehicle's ON-STAR system (where equipped) which proceeds to audibly recite the message to the vehicle's driver. Tag Update Module 624 updates the vehicle's electronic tag with the current test data and test results. Account Deduction Module 625 automatically deducts a cost of the emissions test from the user's pre-funded account associated with their electronic tag. Alternatively, the emissions test could be performed for every vehicle passing though the emissions testing structure independently of the need to collect data for statistics purpose.

It should be understood that any of the modules and processing units of FIG. 6 are in communication with workstation 602 via pathways (not shown) and may further be in communication with one or more remote devices over network 601. Any of the modules may communicate with storage devices 608 and 619 via pathways shown and not shown and may store/retrieve data, parameter values, functions, records, data, and machine readable/executable program instructions required to perform their intended functions. Some or all of the functionality for any of the modules of the functional block diagram of FIG. 6 may be performed, in whole or in part, by components internal to workstation 602 or by a special purpose computer system. Various modules may designate one or more components which may, in turn, comprise software and/or hardware designed to perform the intended function. A plurality of modules may collectively perform a single function. Each module may have a specialized processor and memory capable of executing machine readable program instructions. A module may comprise a single piece of hardware such as an ASIC, electronic circuit, or special purpose processor. A plurality of modules may be executed by either a single special purpose computer system or a plurality of special purpose systems operating in parallel. Connections between modules include both physical and logical connections. Modules may further include one or more software/hardware components which may further comprise an operating system, drivers, device controllers, and other apparatuses some or all of which may be connected via a network. It is also contemplated that one or more aspects of the present method may be implemented on a dedicated computer system and may also be practiced in distributed computing environments where tasks are performed by remote devices that are linked through a network.

Absorption Lines and Radiance Spectrum

Figure 7:
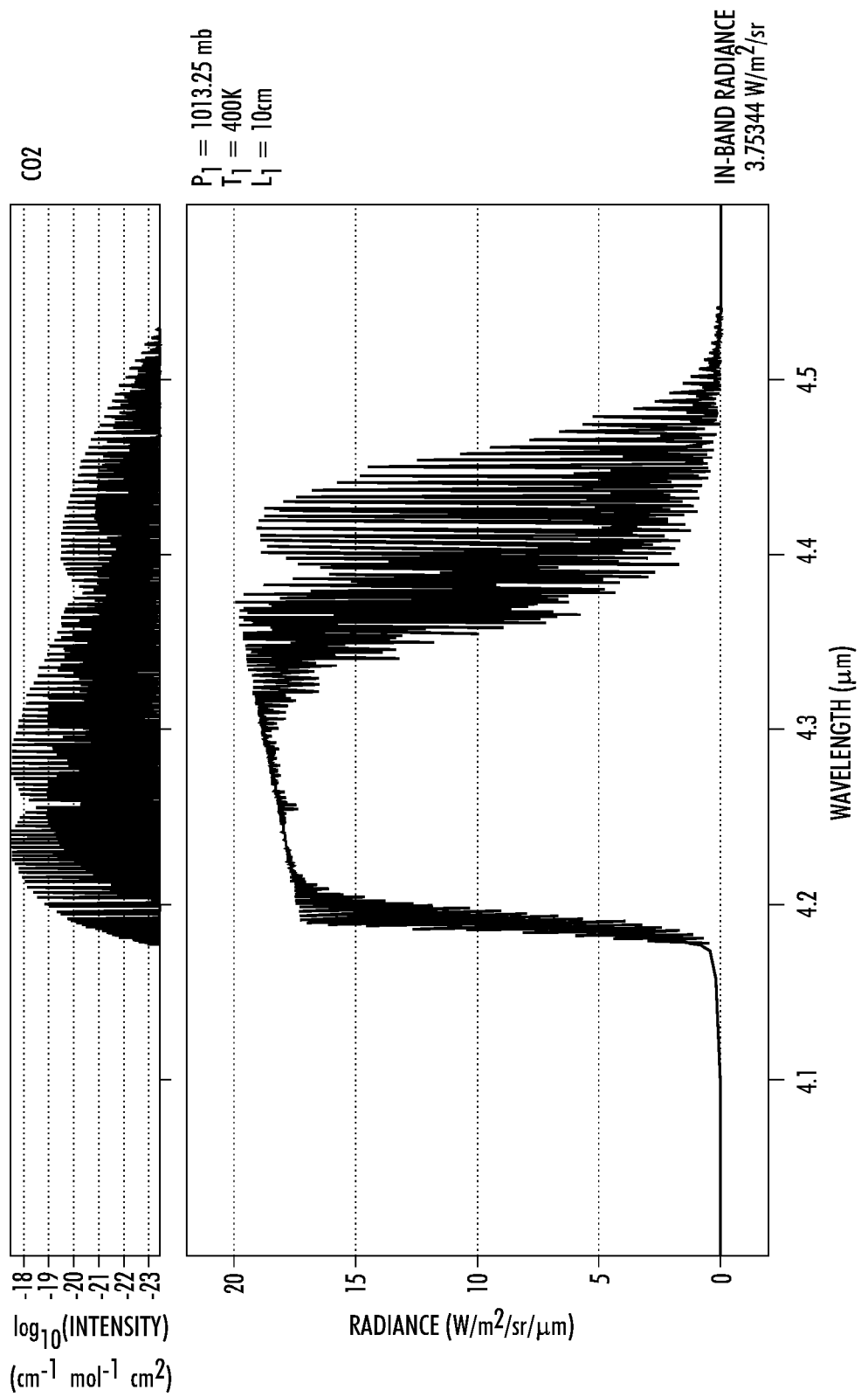
FIG. 7 shows carbon dioxide absorption lines (top graph) and radiance spectrum (bottom graph)

FIG. 7 shows carbon dioxide ($CO_2$) absorption lines (top graph) and radiance spectrum (bottom graph) for Pressure=1 atmosphere, Temperature=400° Kelvin, L=10 cm (depth of the sample), and VMR=0.1 for the hypothetical case where atmospheric $CO_2$ is zero. The grayed-out area is the fraction of the radiance that is lost due to the filter used.

Figure 8:
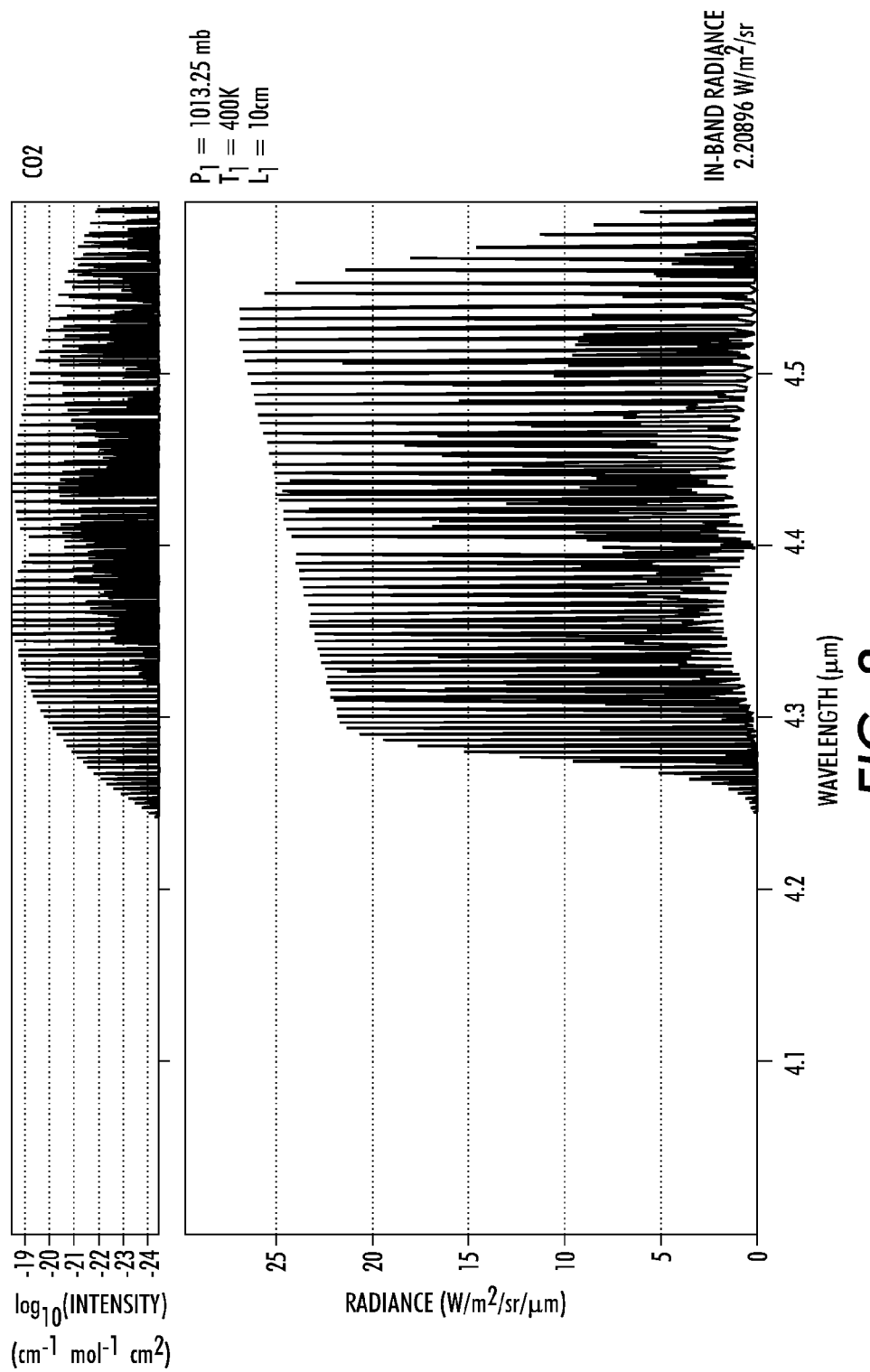
FIG. 8 shows carbon monoxide absorption lines (top graph) and radiance spectrum (bottom graph).

FIG. 8 shows carbon monoxide (CO) absorption lines (top graph) and radiance spectrum (bottom graph) for Pressure=1 atmosphere, Temperature=400° K, L=10 cm (depth of the sample), and VMR=0.1 for the hypothetical case where atmospheric CO is zero. The grayed-out area is the fraction of the radiance that is lost due to the filter used.

Various Embodiments

The teachings hereof can be implemented in hardware or software using any known or later developed systems, structures, devices, and/or software by those skilled in the applicable art without undue experimentation from the functional description provided herein with a general knowledge of the relevant arts. Such a special purpose computer system is capable of executing machine executable program instructions and may comprise a micro-processor, micro-controller, ASIC, electronic circuit, or any combination thereof.

One or more aspects of the methods described herein are intended to be incorporated in an article of manufacture, including one or more computer program products, having computer usable or machine readable media. The article of manufacture may be included on at least one storage device readable by a machine architecture embodying executable program instructions capable of performing the methodology and functionality described herein. Additionally, the article of manufacture may be included as part of a complete system or provided separately, either alone or as various components.

It will be appreciated that various of the above-disclosed and other features and functions, or alternatives thereof, may be desirably combined into many other different systems or applications. Presently unforeseen or unanticipated alternatives, modifications, variations, or improvements therein may become apparent and/or subsequently made by those skilled in the art, which are also intended to be encompassed by the following claims. Accordingly, the embodiments set forth above are considered to be illustrative and not limiting. Various changes to the above-described embodiments may be made without departing from the spirit and scope of the invention.

The teachings of any printed publications including patents and patent applications, are each separately hereby incorporated by reference in their entirety.

What is claimed is:

1. A method for image-based determination of concentration of CO and $CO_2$ in a vehicle's exhaust gas, the method comprising:
   receiving at least one IR image of an exhaust plume of a motor vehicle, said IR image having been captured using a mid-wave infrared camera having at least one optical filter tuned to the infrared absorption band of any of: CO and $CO_2$, said IR image comprising an array of pixels with intensity values obtained at said absorption band, and said IR image comprising at least a region of pixels in said array of pixels representing the exhaust plume and a reference region of pixels in said array of pixels representing a reference surface comprising a known radiance with a known temperature and emissivity;
   isolating said region of pixels representing said exhaust plume;
   isolating said reference region of pixels representing said reference surface;
   normalizing intensity values of pixels in said isolated region by a value of said known radiance of said reference surface; and
   determining, based on said normalizing, a concentration of any of CO and $CO_2$ in said exhaust plume using a calibration curve which relates pixel intensities to concentration levels.

2. The method of claim 1, wherein said calibration curve is derived using any of: a physics-based parameterized model which relates pixel intensities to gas concentration in any of: parts-per-million units, a volumetric percentage, and grams/mile, and by experimental methods that produce a result that can be represented in terms of a unit of measurement.

3. The method of claim 1, wherein said mid-wave infrared camera has a sensitivity band that includes 4.0 µm to 4.5 µm to collect light emitted by a roto-vibrational mode of $CO_2$ molecules, and a spectral band-pass filter which allows $CO_2$ emission light to enter a lens of said camera.

4. The method of claim 3, wherein said filter comprises a narrow band-pass filter to increase a contrast of $CO_2$ relative to a background radiation.

5. The method of claim 1, wherein said mid-wave infrared camera has a sensitivity band that includes 4.5 µm to 5.0 µm to collect light emitted by a roto-vibrational mode of CO molecules, and a spectral band-pass filter which allows CO emission light to enter a lens of said camera.

6. The method of claim 5, wherein said filter comprises a narrow band-pass filter to increase a contrast of CO relative to a background radiation.

7. The method of claim 1, further comprising comparing said determined $CO_2$ concentration to an emissions standard set for said vehicle to determine whether said vehicle is a gross polluter, said vehicle being a gross polluter if said determined concentration is at least twice the limit set by said emissions standard for this vehicle.

8. The method of claim 7, further comprising an emissions enforcement authority issuing a citation to a registered owner of said vehicle in response to said vehicle being a gross polluter.

9. The method of claim 1, further comprising comparing said determined CO concentration to an emissions standard set for said vehicle to determine whether said vehicle is a gross polluter, said vehicle being a gross polluter if said determined concentration is at least twice the limit set by said emissions standard for this vehicle.

10. The method of claim 9, further comprising an emissions enforcement authority issuing a citation to a registered owner of said vehicle in response to said vehicle being a gross polluter.

11. The method of claim 1, further comprising communicating said concentration to any of: a memory, a storage device, a graphical display, a telephonic messaging system, and a computer workstation.

12. An emissions detection system for image-based determination of concentration of CO and $CO_2$ in a vehicle's exhaust gas, the system comprising:
  a mid-wave infrared camera system having at least one optical filter tuned to the infrared absorption band of any of: CO and $CO_2$; and
  a processor in communication with said camera and a memory, said processor executing machine readable instructions for performing:
    receiving at least one IR image of an exhaust plume of a motor vehicle, said IR image having been captured using said mid-wave infrared camera, said IR image comprising, in part, an array of pixels having intensity values obtained at said absorption band, and said IR image comprising at least a region of pixels in said array of pixels representing the exhaust plume and a reference region of pixels in said array of pixels representing a reference surface comprising a known radiance with a known temperature and emissivity;
    isolating said region of pixels representing said exhaust plume;
    isolating said reference region of pixels representing said reference surface;
    normalizing intensity values of pixels in said isolated region by a value of said known radiance of said reference surface; and
    determining, based on said normalizing, a concentration of any of CO and $CO_2$ in said exhaust plume using a calibration curve which relates pixel intensities to concentration levels.

13. The emissions detection system of claim 12, wherein said calibration curve is derived using any of: a physics-based parameterized model which relates pixel intensities to gas concentration in any of: parts-per-million units, a volumetric percentage, and grams/mile, and by experimental methods that produce a result that can be represented in terms of a unit of measurement.

14. The emissions detection system of claim 12, wherein said mid-wave infrared camera has a sensitivity band that includes 4.0 µm to 4.5 µm to collect light emitted by a roto-vibrational mode of $CO_2$ molecules, and a spectral band-pass filter which allows $CO_2$ emission light to enter a lens of said camera.

15. The emissions detection system of claim 14, wherein said filter comprises a narrow band-pass filter to increase a contrast of $CO_2$ relative to a background radiation.

16. The emissions detection system of claim 12, wherein said mid-wave infrared camera has a sensitivity band that includes 4.5 µm to 5.0 µm to collect light emitted by a roto-vibrational mode of CO molecules, and a spectral band-pass filter which allows CO emission light to enter a lens of said camera.

17. The emissions detection system of claim 16, wherein said filter comprises a narrow band-pass filter to increase a contrast of CO relative to a background radiation.

18. The emissions detection system of claim 12, further comprising comparing said determined $CO_2$ concentration to an emissions standard set for said vehicle to determine whether said vehicle is a gross polluter, said vehicle being a gross polluter if said determined concentration is at least twice the limit set by said emissions standard for this vehicle.

19. The emissions detection system of claim 18, further comprising an emissions enforcement authority issuing a citation to a registered owner of said vehicle in response to said vehicle being a gross polluter.

20. The emissions detection system of claim 12, further comprising comparing said determined CO concentration to an emissions standard set for said vehicle to determine whether said vehicle is a gross polluter, said vehicle being a gross polluter if said determined concentration is at least twice the limit set by said emissions standard for this vehicle.

21. The emissions detection system of claim 20, further comprising an emissions enforcement authority issuing a citation to a registered owner of said vehicle in response to said vehicle being a gross polluter.

22. The emissions detection system of claim 12, further comprising communicating said concentration to any of: said memory, a storage device, a graphical display, a telephonic messaging system, and a computer workstation.

23. A computer implemented method for image-based determination of concentration of CO and $CO_2$ in a vehicle's exhaust gas, the method comprising:
  receiving at least one IR image of an exhaust plume of a motor vehicle intended to be tested for exhaust emissions, said IR image having been captured using a mid-wave infrared camera having at least one optical filter tuned to the infrared absorption band of at least one of: CO and $CO_2$ said IR image comprising an array of pixels with intensity values obtained at said absorption band;

isolating a region of pixels in the array of pixels representing said exhaust plume;

isolating a reference region of pixels in the array of pixels representing a reference surface;

normalizing intensity values of pixels in said isolated region by a value of a known radiance of said reference surface with a known temperature and emissivity;

determining, based on said normalizing, a concentration of any of CO and $CO_2$ in said exhaust plume using a calibration curve which relates pixel intensities to concentration levels; and comparing said determined concentrations to an emissions standard set for said vehicle to determine whether said vehicle is a gross polluter, said vehicle being a gross polluter if said determined concentration is at least twice the limit set by said emissions standard for this vehicle.

* * * * *